(12) United States Patent
Shibata

(10) Patent No.: US 7,571,487 B2
(45) Date of Patent: Aug. 4, 2009

(54) TERMINAL DEVICE, INFORMATION STORAGE MEDIUM, AND DATA PROCESSING METHOD

(75) Inventor: Hideyuki Shibata, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 818 days.

(21) Appl. No.: 11/175,255

(22) Filed: Jul. 7, 2005

(65) Prior Publication Data

US 2006/0013080 A1 Jan. 19, 2006

(30) Foreign Application Priority Data

Jul. 8, 2004 (JP) ............................. 2004-201805
May 16, 2005 (JP) ............................. 2005-142817

(51) Int. Cl.
*G06F 7/04* (2006.01)
*G06F 17/30* (2006.01)
*H04N 7/16* (2006.01)

(52) U.S. Cl. ........................ 726/26; 713/166; 713/164

(58) Field of Classification Search .................. 726/26; 369/30.01; 713/164, 166
See application file for complete search history.

(56) References Cited

U.S. PATENT DOCUMENTS

| | | | | |
|---|---|---|---|---|
| 4,183,085 | A * | 1/1980 | Roberts et al. ................. | 705/76 |
| 6,272,611 | B1 * | 8/2001 | Wu ............................. | 711/173 |
| 6,651,171 | B1 * | 11/2003 | England et al. ............. | 713/193 |
| 6,694,436 | B1 * | 2/2004 | Audebert ....................... | 726/9 |
| 6,745,306 | B1 * | 6/2004 | Willman et al. ............. | 711/163 |
| 6,976,175 | B2 * | 12/2005 | England et al. ............. | 713/150 |
| 6,986,059 | B2 * | 1/2006 | England et al. ............... | 705/51 |
| 7,020,772 | B2 * | 3/2006 | England et al. ............. | 713/166 |
| 7,194,255 | B2 * | 3/2007 | Boman et al. ............. | 455/414.1 |
| 7,305,534 | B2 * | 12/2007 | Watt et al. .................... | 711/163 |
| 7,406,333 | B2 * | 7/2008 | Aerrabotu et al. ........... | 455/558 |
| 2002/0042859 | A1 | 4/2002 | Lowry | |
| 2004/0044906 | A1 * | 3/2004 | England et al. ............. | 713/200 |
| 2004/0049687 | A1 | 3/2004 | Orsini et al. | |
| 2004/0097266 | A1 * | 5/2004 | Aerrabotu et al. ........... | 455/558 |
| 2004/0143746 | A1 * | 7/2004 | Ligeti et al. ................. | 713/185 |
| 2004/0187019 | A1 * | 9/2004 | Nanki et al. ................. | 713/200 |
| 2004/0203663 | A1 * | 10/2004 | Boman et al. ............. | 455/414.1 |
| 2004/0255123 | A1 * | 12/2004 | Noyama et al. ............. | 713/176 |

(Continued)

FOREIGN PATENT DOCUMENTS

EP 1 063 589 A1 12/2000

(Continued)

*Primary Examiner*—David Garcia Cervetti
(74) *Attorney, Agent, or Firm*—Oliff & Berridge, PLC

(57) ABSTRACT

A portable telephone is configured to include a storage section which includes a protected area and a user area, an encryption processing section which encrypts arbitrary data to generate encrypted data, a separation processing section which divides the encrypted data at an arbitrary position, stores first divided data which is a piece of the divided data and division position information indicating the division position in the protected area, and stores second divided data which is the remaining piece of the divided data in the user area, a recovery processing section which recovers the encrypted data based on the first and second divided data and the division position information when a use request for the arbitrary data has been issued, and a decryption processing section which decrypts the recovered encrypted data.

10 Claims, 4 Drawing Sheets

U.S. PATENT DOCUMENTS

| | | | |
|---|---|---|---|
| 2004/0263903 A1* | 12/2004 | Oikawa | 358/1.15 |
| 2005/0050108 A1* | 3/2005 | Sawant et al. | 707/200 |
| 2005/0086324 A1* | 4/2005 | Jeong | 709/217 |
| 2005/0141525 A1* | 6/2005 | Rose | 370/401 |
| 2005/0234907 A1* | 10/2005 | Yamagishi et al. | 707/5 |
| 2006/0129848 A1* | 6/2006 | Paksoy et al. | 713/193 |
| 2006/0242065 A1* | 10/2006 | Jogand-Coulomb et al. | 705/50 |
| 2007/0266444 A1* | 11/2007 | Segal | 726/27 |
| 2008/0162780 A1* | 7/2008 | Kohinata et al. | 711/100 |
| 2008/0208697 A1* | 8/2008 | Kargman et al. | 705/17 |
| 2008/0235483 A1* | 9/2008 | Bi et al. | 711/173 |
| 2008/0294911 A1* | 11/2008 | Nguyen et al. | 713/193 |

FOREIGN PATENT DOCUMENTS

| | | |
|---|---|---|
| GB | 2 403 320 A | 12/2004 |
| JP | A-2003-143131 | 5/2003 |
| JP | A-2004-046431 | 2/2004 |

* cited by examiner

TERMINAL DEVICE, INFORMATION STORAGE MEDIUM, AND DATA PROCESSING METHOD

Japanese Patent Application No. 2005-142817, filed on May 16, 2005, and Japanese Patent Application No. 2004-201805, filed on Jul. 8, 2004 are hereby incorporated by reference in their entireties.

BACKGROUND OF THE INVENTION

The present invention relates to a terminal device, a program, an information storage medium, and a data processing method capable of protecting data.

In the case of downloading game data to a portable telephone and performing a game, a problem may occur in which the game data is read by a user operation.

As a method for solving such a problem, a method of dividing the game data, a method of encrypting the game data, and the like may be employed.

Japanese Patent Application Laid-Open No. 2003-143131 discloses an electronic information management device which divides encrypted data into a plurality of pieces, writes each piece while designating random physical position information, creates a correspondence table including the physical position information, writes an encrypted correspondence table obtained by encrypting the correspondence table while designating the physical position information, and transmits the physical position information to a management server device, so that the stored contents are prevented from being deciphered when a storage device is analyzed.

Japanese Patent Application Laid-Open No. 2004-46431 discloses a portable telephone which records encrypted data in an external recording device using a secret key encryption method, decrypts and displays the encrypted data so that the contents recorded in a built-in recording section with a relatively small storage capacity can be backed up while preventing infringement of the copyright of the contents and privacy.

However, since these methods store the entire encrypted data in a single storage section in the same manner as in the related art, the storage section must have a large storage capacity.

The method disclosed in Japanese Patent Application Laid-Open No. 2004-46431 records the encrypted data in the external recording device. However, it is preferable to store the encrypted data in the storage section inside the device in order to prevent infringement of copyright and privacy.

SUMMARY

A first aspect of the invention relates to a terminal device, comprising:
 a storage section which includes a protected area and a user area, the protected area being inaccessible by a user operation and the user area being accessible by the user operation;
 a separation processing section which divides arbitrary data at an arbitrary position, and stores first divided data in the protected area, second divided data in the user area and division position information in the protected area or the user area, the first divided data being a piece of the divided data, the second divided data being a remaining piece of the divided data, and division position information indicating a division position; and
 a recovery processing section which recovers the arbitrary data based on the first and second divided data and the division position information when a use request for the arbitrary data has been issued.

A second aspect of the invention relates to a terminal device, comprising:
 a storage section which includes a protected area and a user area, the protected area being inaccessible by a user operation and the user area being accessible by the user operation;
 a preprocessing section which preprocesses arbitrary data to generate preprocessed data;
 a separation processing section which divides the preprocessed data at an arbitrary position, and stores first divided data in the protected area, second divided data in the user area and division position information in the protected area or the user area, the first divided data being a piece of the divided preprocessed data, the second divided data being a remaining piece of the divided preprocessed data, and division position information indicating a division position; and
 a recovery processing section which recovers the preprocessed data based on the first and second divided data and the division position information when a use request for the arbitrary data has been issued;
 a conversion section which converts the preprocessed data recovered by the recovery processing section into the arbitrary data.

A third aspect of the invention relates to a computer-readable program which causes a computer to function as:
 a storage section which includes a protected area and a user area, the protected area being inaccessible by a user operation and the user area being accessible by the user operation;
 a separation processing section which divides arbitrary data at an arbitrary position, and stores first divided data in the protected area, second divided data in the user area and division position information in the protected area or the user area, the first divided data being a piece of the divided data, the second divided data being a remaining piece of the divided data, and division position information indicating a division position; and
 a recovery processing section which recovers the arbitrary data based on the first and second divided data and the division position information when a use request for the arbitrary data has been issued.

A fourth aspect of the invention relates to a computer-readable program which causes a computer to function as:
 a storage section which includes a protected area and a user area, the protected area being inaccessible by a user operation and the user area being accessible by the user operation;
 a preprocessing section which preprocesses arbitrary data to generate preprocessed data;
 a separation processing section which divides the preprocessed data at an arbitrary position, and stores first divided data in the protected area, second divided data in the user area and division position information in the protected area or the user area, the first divided data being a piece of the divided preprocessed data, the second divided data being a remaining piece of the divided preprocessed data, and division position information indicating a division position; and
 a recovery processing section which recovers the preprocessed data based on the first and second divided data and the division position information when a use request for the arbitrary data has been issued;

a conversion section which converts the preprocessed data recovered by the recovery processing section into the arbitrary data.

A fifth aspect of the invention relates to a computer-readable information storage medium which stores any one of the above programs.

A sixth aspect of the invention relates to a data processing method, comprising:

dividing arbitrary data at an arbitrary position;

storing first divided data in a protected area which is inaccessible by a user operation, the first divided data being a piece of the divided data;

storing second divided data in a user area which is accessible by the user operation, the second divided data being a remaining piece of the divided data;

storing division position information in the protected area or the user area, division position information indicating a division position; and recovering the arbitrary data based on the first and second divided data and the division position information when a use request for the arbitrary data has been issued.

A seventh aspect of the invention relates to a data processing method, comprising:

preprocessing arbitrary data to generate preprocessed data;

dividing the preprocessed data at an arbitrary position, storing first divided data in a protected area which is inaccessible by a user operation, the first divided data being a piece of the divided data;

storing second divided data in a user area which is accessible by the user operation, the second divided data being a remaining piece of the divided data;

storing division position information in the protected area or the user area, division position information indicating a division position; and recovering the preprocessed data based on the first and second divided data and the division position information when a use request for the arbitrary data has been issued;

converting the preprocessed data recovered by the recovery processing section into the arbitrary data.

DETAILED DESCRIPTION OF THE EMBODIMENT

Figure 1:
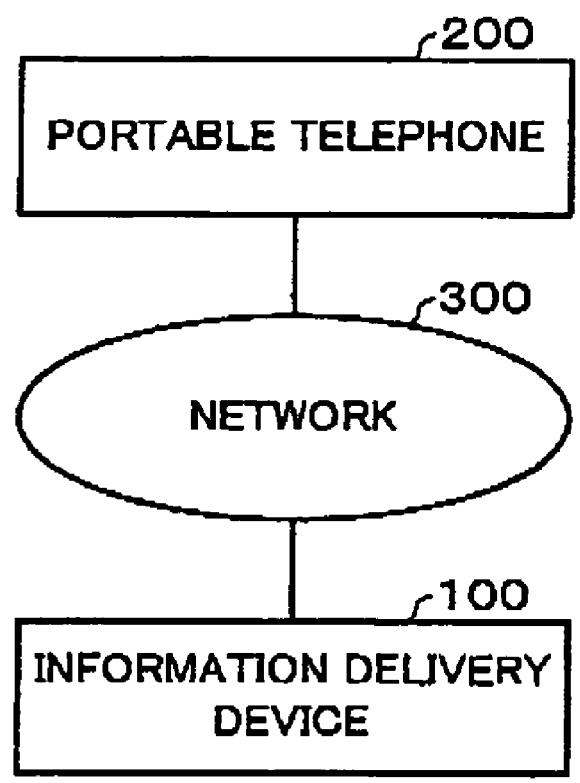
FIG. 1 is a schematic diagram of the entire system according to an example of one embodiment of the invention.

The invention may provide a terminal device, a program, an information storage medium, and a data processing method capable of appropriately protecting data even if the storage capacity of a protected area inaccessible by a user operation is small.

A terminal device according to an embodiment of the invention includes:

a storage section which includes a protected area and a user area, the protected area being inaccessible by a user operation and the user area being accessible by the user operation;

a separation processing section which divides arbitrary data at an arbitrary position, and stores first divided data in the protected area, second divided data in the user area and division position information in the protected area or the user area, the first divided data being a piece of the divided data, the second divided data being a remaining piece of the divided data, and division position information indicating a division position; and a recovery processing section which recovers the arbitrary data based on the first and second divided data and the division position information when a use request for the arbitrary data has been issued.

A computer-readable program according to an embodiment of the invention causes a computer to function as:

a storage section which includes a protected area and a user area, the protected area being inaccessible by a user operation and the user area being accessible by the user operation;

a separation processing section which divides arbitrary data at an arbitrary position, and stores first divided data in the protected area, second divided data in the user area and division position information in the protected area or the user area, the first divided data being a piece of the divided data, the second divided data being a remaining piece of the divided data, and division position information indicating a division position; and a recovery processing section which recovers the arbitrary data based on the first and second divided data and the division position information when a use request for the arbitrary data has been issued.

An information storage medium according to an embodiment of the invention stores the above computer-readable program.

A data processing method according to an embodiment of the invention includes:

dividing arbitrary data at an arbitrary position;

storing first divided data in a protected area which is inaccessible by a user operation, the first divided data being a piece of the divided data;

storing second divided data in a user area which is accessible by the user operation, the second divided data being a remaining piece of the divided data;

storing division position information in the protected area or the user area, division position information indicating a division position; and recovering the arbitrary data based on the first and second divided data and the division position information when a use request for the arbitrary data has been issued.

According to these embodiments, the terminal device or the like divides the original data into the first divided data and the second divided data, and stores the first divided data and the second divided data respectively in the protected area and the user area so that the first divided data having a size smaller than that of the original data can be stored, even if the storage capacity of the protected area inaccessible by the user operation is small. Therefore, the data can be appropriately protected.

According to these embodiments, the terminal device or the like can appropriately protect the data by dividing the data without encrypting the data.

A terminal device according to an embodiment of the invention includes:

a storage section which includes a protected area and a user area, the protected area being inaccessible by a user operation and the user area being accessible by the user operation;

a preprocessing section which preprocesses arbitrary data to generate preprocessed data;

a separation processing section which divides the preprocessed data at an arbitrary position, and stores first divided data in the protected area, second divided data in the user area and division position information in the protected area or the user area, the first divided data being a piece of the divided preprocessed data, the second divided data being a remaining piece of the divided preprocessed data, and division position information indicating a division position; and a recovery processing section which recovers the preprocessed data based on the first and second divided data and the division position information when a use request for the arbitrary data has been issued;

a conversion section which converts the preprocessed data recovered by the recovery processing section into the arbitrary data.

A computer-readable program according to an embodiment of the invention causes a computer to function as:

a storage section which includes a protected area and a user area, the protected area being inaccessible by a user operation and the user area being accessible by the user operation;

a preprocessing section which preprocesses arbitrary data to generate preprocessed data;

a separation processing section which divides the preprocessed data at an arbitrary position, and stores first divided data in the protected area, second divided data in the user area and division position information in the protected area or the user area, the first divided data being a piece of the divided preprocessed data, the second divided data being a remaining piece of the divided preprocessed data, and division position information indicating a division position; and a recovery processing section which recovers the preprocessed data based on the first and second divided data and the division position information when a use request for the arbitrary data has been issued;

a conversion section which converts the preprocessed data recovered by the recovery processing section into the arbitrary data.

An information storage medium according to an embodiment of the invention stores the above computer-readable program.

A data processing method according to an embodiment of the invention includes:

preprocessing arbitrary data to generate preprocessed data;

dividing the preprocessed data at an arbitrary position, storing first divided data in a protected area which is inaccessible by a user operation, the first divided data being a piece of the divided data;

storing second divided data in a user area which is accessible by the user operation, the second divided data being a remaining piece of the divided data;

storing division position information in the protected area or the user area, division position information indicating a division position; and recovering the preprocessed data based on the first and second divided data and the division position information when a use request for the arbitrary data has been issued;

converting the preprocessed data recovered by the recovery processing section into the arbitrary data.

According to these embodiments, the terminal device or the like divides the original data into the first divided data and the second divided data, and stores the first divided data and the second divided data respectively in the protected area and the user area so that the first divided data having a size smaller than that of the original data can be stored, even if the storage capacity of the protected area inaccessible by the user operation is small. Therefore, the data can be appropriately protected.

With the terminal device, program, information storage medium and data processing method, the preprocessing may be one of, or a combination of compression processing, encryption processing, randomization processing, and transformation processing based on a predetermined algorithm.

According to this feature, the terminal device or the like can further reduce the necessary storage area by dividing the data after compression. Moreover, since data redundancy is lost, it becomes more difficult to recover the original data.

According to this feature, since the terminal device or the like divides the data after encrypting the data, it is extremely difficult to recover the original data even if the divided data is read, whereby the data can be protected more appropriately.

With the terminal device, program, and information storage medium, when at least one of the first divided data and the second divided data is divided into a plurality of pieces, the separation processing section may combine the plurality of pieces.

In the data processing method, when at least one of the first divided data and the second divided data is divided into a plurality of pieces, the plurality of pieces may be combined.

According to this feature, the terminal device or the like can store the divided data using a smaller storage capacity.

With the terminal device, program, and information storage medium, the separation processing section may generate the second divided data by inputting dummy data into a space area formed by separating the first divided data from the arbitrary data, so that a size of the arbitrary data is equal to a size of the second divided data.

According to this feature, since the size or the arbitrary data before division is equal to the size of the second divided data, the change in the storage area is small, whereby the terminal device or the like can perform the data processing more efficiently.

The terminal device may include a reception section which receives the arbitrary data from an information delivery device.

The program and information storage medium may cause a computer to function as a reception section which receives the arbitrary data from an information delivery device.

The data processing method may receive the arbitrary data from an information delivery device.

According to these embodiments, the terminal device or the like can appropriately protect the received data.

Note that the embodiments described hereunder do not in any way limit the scope of the invention defined by the claims laid out herein. Note also that not all of the elements of these embodiments should be taken as essential requirements to the means of the present invention.

Description of Entire System

FIG. 1 is a schematic diagram of the entire system according to an example of one embodiment of the invention.

The system is configured to include an information delivery device 100, and a portable telephone 200 which is one type of a terminal device which receives arbitrary data from the information delivery device 100 through a network 300.

The embodiment illustrates an example in which the portable telephone 200 having a game execution function receives game data (which may include a game program) as the arbitrary data.

A portable telephone having a game execution function generally includes a protected area inaccessible by a user operation so that data stored in the protected area is protected. However, a related-art portable telephone cannot store a large amount of protection target data due to a limited storage capacity of the protected area.

The portable telephone 200 according to the embodiment can appropriately protect data, even if the protected area is small, by dividing data into first divided data and second divided data and separately storing the divided data in the protected area and a user area.

The functional blocks of the portable telephone 200 for implementing such a function by a computer are described below.

Figure 2:
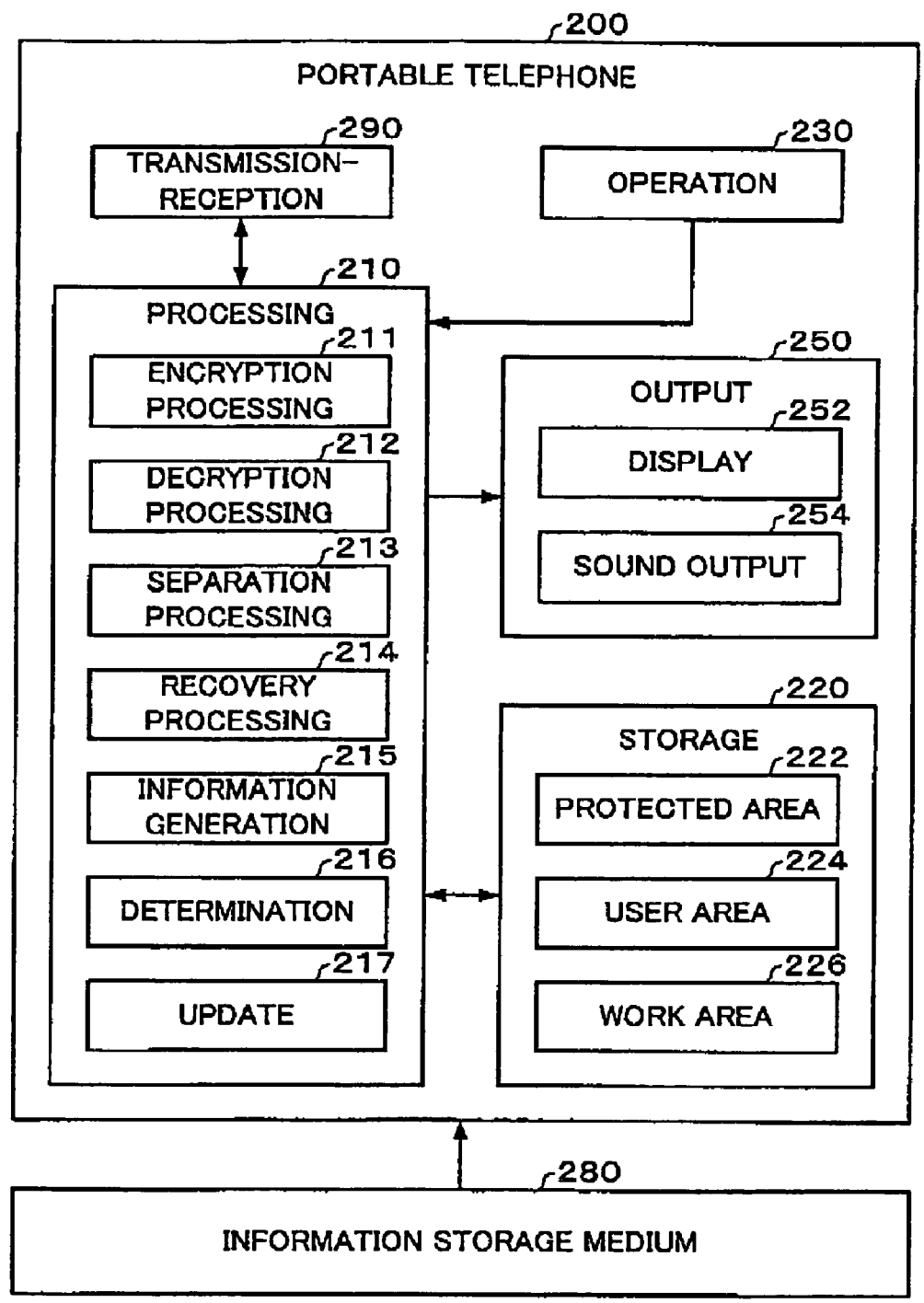
FIG. 2 is a functional block diagram of a portable telephone according to an example of one embodiment of the invention.

FIG. 2 is a functional block diagram of the portable telephone 200 according to an example of the embodiment.

The portable telephone 200 is configured to include a transmission-reception section 290 including a reception section which receives data from the information delivery device 100, an operation section 230, a processing section 210 which performs various types of data processing, a storage section 220, and an output section 250.

The storage section 220 is configured to include a protected area 222 inaccessible by the user operation, a user area 224 accessible by the user operation, and a work area 226 which temporarily stores data.

The processing section 210 is configured to include an encryption processing section 211 which encrypts game data received from the information delivery device 100 to generate encrypted data, a separation processing section 213 which divides the encrypted data at an arbitrary position, stores first divided data which is a piece of the divided data and division position information indicating the division position in the protected area 222, and stores second divided data which is the remaining piece of the divided data in the user area 224, a recovery processing section 214 which recovers the encrypted data based on the first and second divided data and the division position information when a use request for the game data has been issued, and a decryption processing section 212 which decrypts the recovered encrypted data.

The encryption processing section 211 is one type of a preprocessing section which preprocesses the game data to generate preprocessed data, and the decryption processing section 212 is one type of a conversion section which converts the preprocessed data recovered by the recovery processing section 214 to recover the game data.

The processing section 210 is configured to include an information generation section 215 which generates image information and sound information for executing a game, a determination section 216 which makes various types of determination, and an update section 217 which updates various pieces of data stored in the storage section 220.

The output section 250 is configured to include a display section 252 which displays a game image or the like based on the image information, and a sound output section 254 which outputs game sound or the like based on the sound information.

The function of each section may be implemented by a computer by using a wireless communication module or the like as the transmission-reception section 290, a CPU, an image processing circuit, or the like as the processing section 210, a RAM or the like as the storage section 220, a key or the like as the operation section 230, a liquid crystal panel or the like as the display section 252, and a speaker or the like as the sound output section 254, for example.

As the encryption algorithm of the encryption processing section 211 and the decryption algorithm of the decryption processing section 212, generally used algorithms may be employed.

The separation processing section 213 and the like may be implemented by causing a computer to read a program for causing the computer to function as the separation processing section 213 and the like from an information storage medium 280 in which the program is stored.

The function of each section of the portable telephone 200 may be implemented by causing the computer to read the program from a predetermined host terminal or the like through a network instead of the information storage medium 280.

As the information storage medium 280, a storage medium using a laser or magnetism, such as a CD-ROM, DVD-ROM, IC card, ROM, RAM, memory card, or HDD, may be applied. The program reading method from the information storage medium 280 may be either a contact method or a non-contact method.

Description of Data Processing Flow

A flow of data processing using each section is described below.

Figure 3:
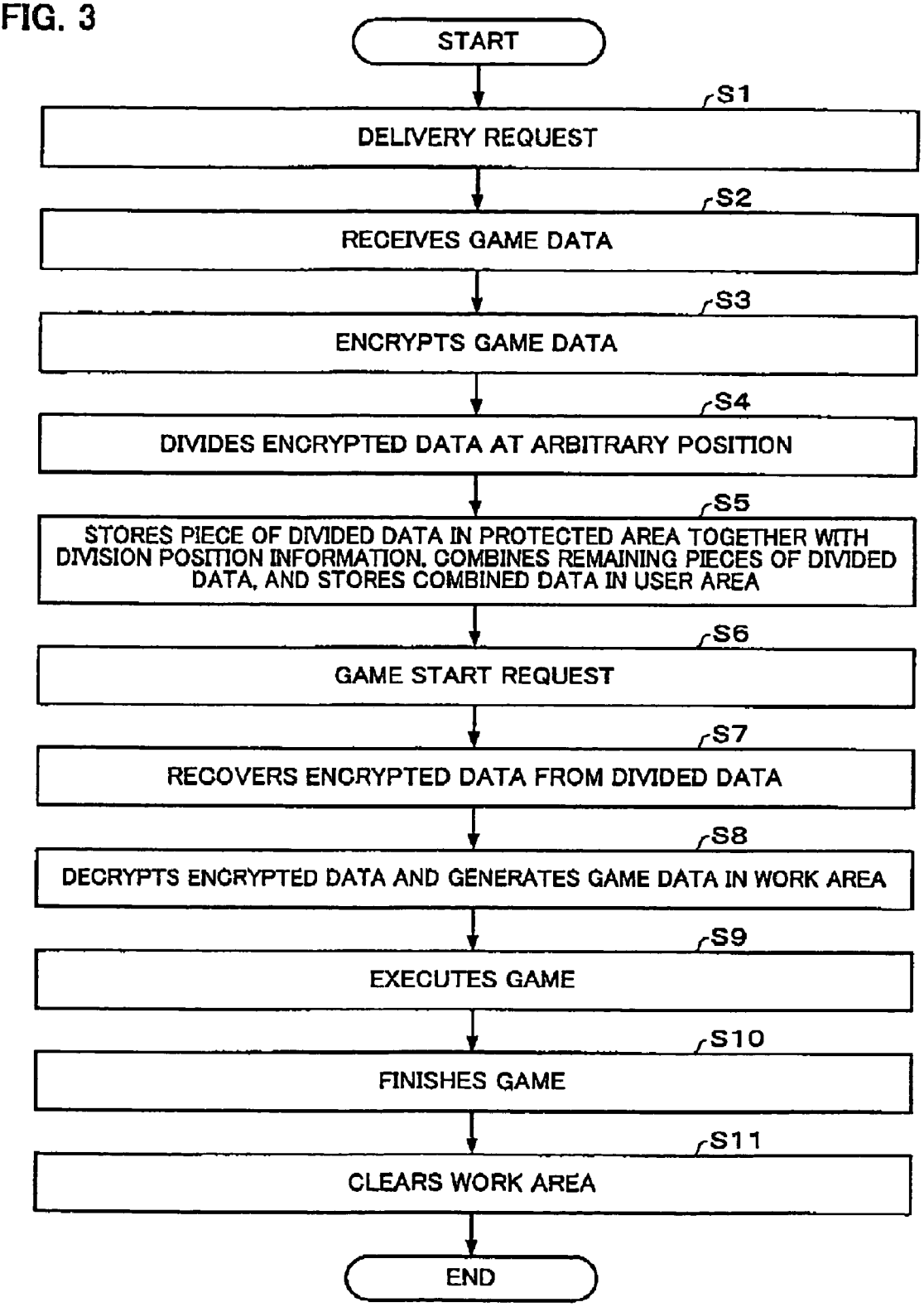
FIG. 3 is a flow chart showing a flow of data processing according to an example of one embodiment of the invention.
Figure 4:
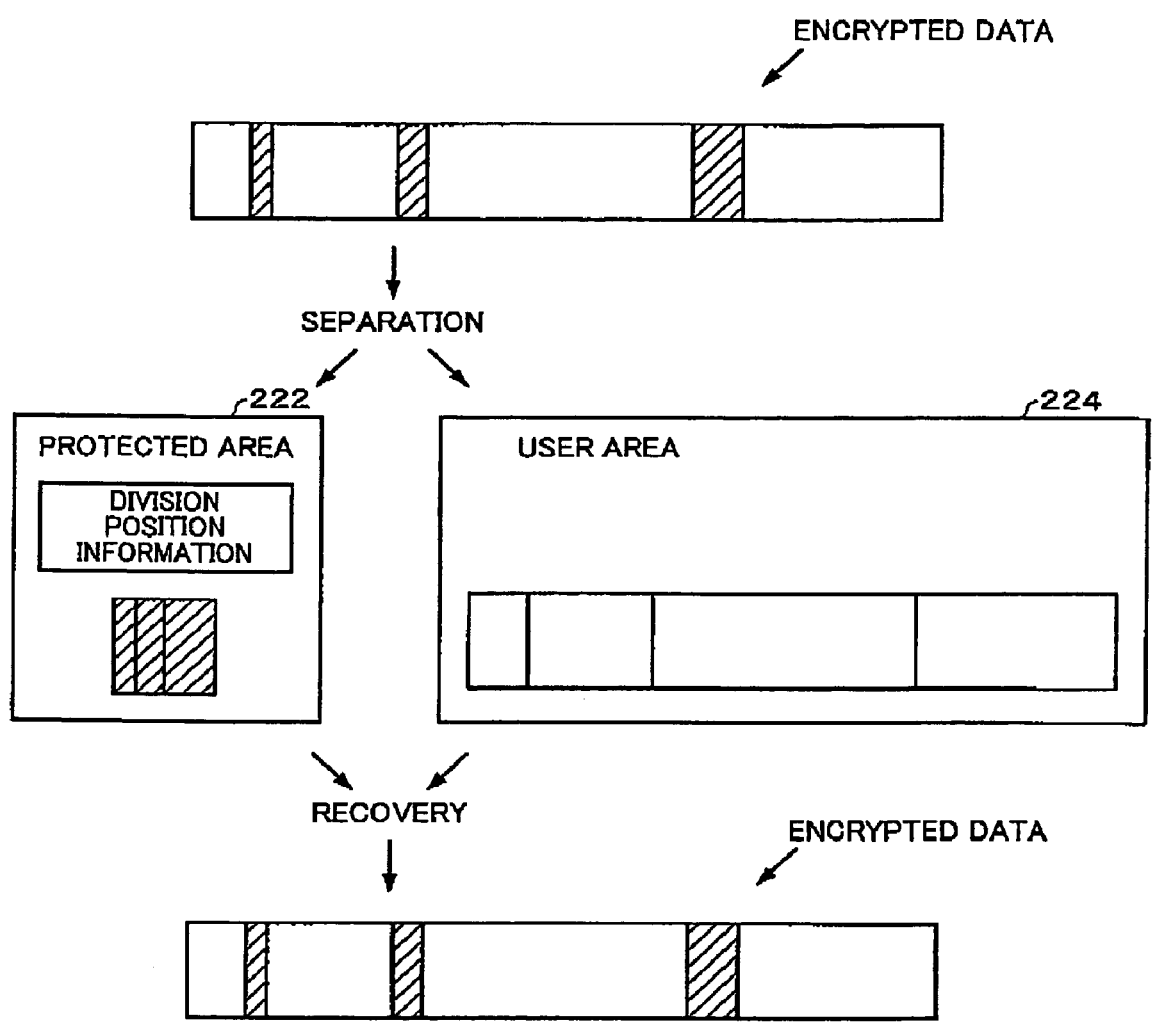
FIG. 4 is a schematic diagram of separation processing and recovery processing according to an example of one embodiment of the invention.

FIG. 3 is a flow chart showing a flow of data processing according to an example of the embodiment. FIG. 4 is a schematic diagram of separation processing and recovery processing according to an example of the embodiment.

The determination section 216 detects that the user has started a game application based on operation information from the operation section 230. When the startup of the application has been detected, the transmission-reception section 290 issues a delivery request by transmitting game data delivery request information to the information delivery device 100 (step S1).

The transmission-reception section 290 receives the game data from the information delivery device 100 (step S2).

The encryption processing section 211 encrypts the game data to generate encrypted data (step S3).

The separation processing section 213 divides the encrypted data at arbitrary positions as shown in FIG. 4 (step S4). In FIG. 4, suppose that the pieces of the encrypted data indicated by the diagonal lines make up the first divided data, and the pieces of the encrypted data other than the pieces indicated by the diagonal lines make up the second divided data.

As shown in FIG. 4, the separation processing section 213 stores the first divided data which is a piece of the divided data in the protected area 222 together with the division position information, and combines the remaining pieces of the divided data and stores the combined data in the user area 224 as the second divided data (step S5).

As the division position information shown in FIG. 4, numerical value information indicating the byte position from the head of the encrypted data or the like may be used, for example. In more detail, suppose that the division position information is (30, 40, 110, 120, 300, 330), for example. In this case, the first division position is at a position 30 bytes from the head of the encrypted data. As shown in FIG. 4, it is preferable that the first divided data be data having a size smaller than that of the second divided data.

The user issues a game start request using the operation section 230 (step S6).

When the game start request has been issued, the recovery processing section 214 recovers the original encrypted data based on the first divided data and the division position information stored in the protected area 222 and the second divided data stored in the user area 224, as shown in FIG. 4 (Step S7).

In more detail, the recovery processing section 214 extracts the data for 30 bytes from the head of the second divided data, extracts the data for 10 bytes from the first divided data, extracts the data for 70 bytes from the 31st byte from the head of the second divided data, extracts the data for 10 bytes from the 11th byte of the first divided data, extracts the data for 180 bytes from the 101st byte from the head of the second divided data, extracts the data for 30 bytes from the 21st byte of the first divided data, and extracts the remaining data from the 281st byte from the head of the second divided data using the division position information (30, 40, 110, 120, 300, 330).

The recovery processing section 214 recovers the original encrypted data by sequentially combining the data extracted according to the above-described procedure.

The decryption processing section 212 decrypts the recovered encrypted data and generates the game data in the work area 226 (step S8).

The information generation section 215, the determination section 216, the update section 217, the display section 252, the sound output section 254, and the like execute the game based on the game data stored in the work area 226 (step S9).

When the game has been completed (step S10), the update section 217 clears the work area 226 (step S11). This enables the game data to be appropriately protected.

According to the embodiment, the portable telephone 200 divides the original game data into the first divided data and the second divided data and stores the first divided data and the second divided data respectively in the protected area 222 and the user area 224 so that the portable telephone 200 can store the first divided data having a size smaller than that of the original game data, even if the storage capacity of the protected area 222 inaccessible by the user operation is small, whereby the game data can be appropriately protected.

Specifically, even if the user reads and uses only the second divided data from the user area 224, the user cannot completely recover the original game data. The embodiment utilizes the encryption processing and the decryption processing. However, it is difficult to recover the original data even if the encryption processing and the decryption processing are omitted. If compression processing and decompression processing are used instead of the encryption processing and the decryption processing, since it becomes more difficult to recover the original game data due to the absence of data redundancy, the same effect as in the case of encrypting the data can be obtained, whereby the portable telephone 200 can appropriately protect the game data.

According to the embodiment, since the portable telephone 200 divides the game data after encrypting the game data, it is extremely difficult to recover the original game data even if the divided data is read, whereby the game data can be protected more appropriately.

According to the embodiment, the portable telephone 200 can store the divided data using a smaller storage capacity, even if the divided data is divided into a plurality of pieces, by combining the pieces and storing the combined pieces as the first and second divided data.

In particular, according to the embodiment, when the portable telephone 200 receives various types of game data and the like from the information delivery device 100 and executes various games and the like, the portable telephone 200 can execute various games and the like while protecting the game data and the like even if the storage capacity of the protected area 222 is small. Moreover, according to the embodiment, since the data can be protected without storing the data in an external storage device or an external server, the data can be protected more efficiently and safely.

Modification

A preferred embodiment to which the invention is applied is described above. However, the invention is not limited to the above-described embodiment. Various modifications and variations may be made.

As a modification of the separation processing section 213, the separation processing section 213 may be configured to generate the second divided data by inputting dummy data into the space area formed by separating the first divided data from the original data in order to cause the size of the original data before division to be equal to the size of the second divided data.

According to this configuration, since the size of the original data before division is equal to the size of the second divided data, the change in the storage area is small, whereby the portable telephone 200 can perform the data processing more efficiently. As the dummy data, data in a specific pattern (e.g. data in which all bits are "0", or data in which "0" and "1" are alternately repeated), quasi-data similar to the original data, or the like may be employed. When using the quasi-data, it becomes more difficult for the user to analyze the data since the quasi-data brings about an wrong analysis, whereby the data can be appropriately protected.

As a modification of the division position information, information indicating the size of each piece of divided data or the like may be employed. In the above-described embodiment, the separation processing section 213 stores the division position information in the protected area 222. As a modification, the separation processing section 213 may store the division position information in the user area 224, or may store a piece of the division position information in the protected area 222 and store the remaining piece of the division position information in the user area 224.

The above-described encryption and decryption of data are not indispensable, and the encryption processing section 211 and the decryption processing section 212 may be omitted.

In this case, the portable telephone 200 can also appropriately protect the data by dividing the data without encrypting the data.

The preprocessing is not limited to the above-described encryption processing. For example, the preprocessing may be one of compression processing, randomization processing, and transformation processing based on a predetermined algorithm, or a combination of these processing steps. In the portable telephone 200, the data redundancy is lost by performing compression processing, whereby it becomes more difficult to recover the original data.

The recovery processing section is not limited to the decryption processing section 212. Various means (e.g. decompression processing section) which recover the original data from the preprocessed data according to the preprocessing may be applied as the recovery processing section.

In more detail, the portable telephone 200 may store the game data in a compressed, encrypted, and divided state.

The protected area 222 may be provided in an internal memory of the portable telephone 200, and the user area 224 may be provided in an external memory of the portable telephone 200 or an external device such as the information delivery device 100.

The protection target data is not limited to the game data. For example, arbitrary data such as image data or sound data may be employed.

The above-described embodiment illustrates an example in which the portable telephone 200 is used as the terminal device. However, a terminal device including a storage section having a protected area, such as a PDA, portable game device, consumer game device, digital camera, or digital video camera, may be applied as the terminal device. The terminal device need not necessarily have the communication function. For example, the terminal device may have a function of connecting with an external device and inputting protection target data instead of the communication function.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A terminal device, comprising:
   a storage section which includes a protected area and a user area, the protected area being inaccessible by a user operation and the user area being accessible by the user operation;
   a separation processing section which divides arbitrary data at an arbitrary position, and stores first divided data in the protected area, second divided data in the user area and division position information in the protected area or the user area, the first divided data being a piece of the divided data, the second divided data being a remaining piece of the divided data, and the division position information indicating a division position; and
   a recovery processing section which recovers the arbitrary data based on the first and second divided data and the division position information when a use request for the arbitrary data has been issued, wherein a storage capacity of the protected area is smaller than a storage capacity of the user area.

2. A terminal device, comprising:
   a storage section which includes a protected area and a user area, the protected area being inaccessible by a user operation and the user area being accessible by the user operation;
   a preprocessing section which preprocesses arbitrary data to generate preprocessed data;
   a separation processing section which divides the preprocessed data at an arbitrary position, and stores first divided data in the protected area, second divided data in the user area and division position information in the protected area or the user area, the first divided data being a piece of the divided preprocessed data, the second divided data being a remaining piece of the divided preprocessed data, and the division position information indicating a division position;
   a recovery processing section which recovers the preprocessed data based on the first and second divided data and the division position information when a use request for the arbitrary data has been issued; and
   a conversion section which converts the preprocessed data recovered by the recovery processing section into the arbitrary data, wherein a storage capacity of the protected area is smaller than a storage capacity of the user area.

3. The terminal device as defined in claim 2,
   wherein the preprocessing is one of, or a combination of compression processing, encryption processing, randomization processing, and transformation processing based on a predetermined algorithm.

4. terminal device as defined in claim 2,
   wherein, when at least one of the first divided data and the second divided data is divided into a plurality of pieces, the separation processing section combines the plurality of pieces.

5. The terminal device as defined in claim 2,
   wherein, the separation processing section generates the second divided data by inputting dummy data into a space area formed by separating the first divided data from the arbitrary data, so that a size of the arbitrary data is equal to a size of the second divided data.

6. The terminal device as defined in claim 2, comprising:
   a reception section which receives the arbitrary data from an information delivery device.

7. A computer readable storage medium having a computer-executable program embedded thereon, the program including computer executable instructions, when executed by a computer, causing the computer to function as:
   a storage section which includes a protected area and a user area, the protected area being inaccessible by a user operation and the user area being accessible by the user operation;
   a separation processing section which divides arbitrary data at an arbitrary position, and stores first divided data in the protected area, second divided data in the user area and division position information in the protected area or the user area, the first divided data being a piece of the divided data, the second divided data being a remaining piece of the divided data, and the division position information indicating a division position; and
   a recovery processing section which recovers the arbitrary data based on the first and second divided data and the division position information when a use request for the arbitrary data has been issued, wherein a storage capacity of the protected area is smaller than a storage capacity of the user area.

8. A computer readable storage medium having a computer-executable program embedded thereon, the program including computer executable instructions, when executed by a computer, causing the computer to function as:
   a storage section which includes a protected area and a user area, the protected area being inaccessible by a user operation and the user area being accessible by the user operation;
   a preprocessing section which preprocesses arbitrary data to generate preprocessed data;
   a separation processing section which divides the preprocessed data at an arbitrary position, and stores first divided data in the protected area, second divided data in the user area and division position information in the protected area or the user area, the first divided data being a piece of the divided preprocessed data, the second divided data being a remaining piece of the divided preprocessed data, and the division position information indicating a division position;
   a recovery processing section which recovers the preprocessed data based on the first and second divided data and the division position information when a use request for the arbitrary data has been issued; and
   a conversion section which converts the preprocessed data recovered by the recovery processing section into the arbitrary data, wherein a storage capacity of the protected area is smaller than a storage capacity of the user area.

9. A data processing method, comprising:

dividing arbitrary data at an arbitrary position;

storing first divided data in a protected area which is inaccessible by a user operation, the first divided data being a piece of the divided data;

storing second divided data in a user area which is accessible by the user operation, the second divided data being a remaining piece of the divided data;

storing division position information in the protected area or the user area, the division position information indicating a division position; and recovering the arbitrary data based on the first and second divided data and the division position information when a use request for the arbitrary data has been issued, wherein a storage capacity of the protected area is smaller than a storage capacity of the user area.

10. A data processing method, comprising:

preprocessing arbitrary data to generate preprocessed data;

dividing the preprocessed data at an arbitrary position, storing first divided data in a protected area which is inaccessible by a user operation, the first divided data being a piece of the divided data;

storing second divided data in a user area which is accessible by the user operation, the second divided data being a remaining piece of the divided data;

storing division position information in the protected area or the user area, the division position information indicating a division position;

recovering the preprocessed data based on the first and second divided data and the division position information when a use request for the arbitrary data has been issued; and converting the preprocessed data recovered by the recovery processing section into the arbitrary data, wherein a storage capacity of the protected area is smaller than a storage capacity of the user area.

* * * * *